United States Patent
Van Casteren

(10) Patent No.: US 6,919,695 B2
(45) Date of Patent: Jul. 19, 2005

(54) OVERVOLTAGE PROTECTION FOR HID LAMP BALLAST

(75) Inventor: Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/483,863
(22) PCT Filed: Jul. 5, 2002
(86) PCT No.: PCT/IB02/02053
§ 371 (c)(1), (2), (4) Date: Jan. 14, 2004
(87) PCT Pub. No.: WO03/009651
PCT Pub. Date: Jan. 30, 2003

(65) Prior Publication Data
US 2004/0183459 A1 Sep. 23, 2004

(30) Foreign Application Priority Data
Jul. 19, 2001 (EP) .............................. 01202766

(51) Int. Cl.$^7$ .............................. G05F 1/00; H02H 3/20
(52) U.S. Cl. .................. 315/291; 315/224; 315/209 R; 315/307; 361/91.1; 361/91.2; 361/16
(58) Field of Search .................... 315/291, 307, 315/224, 209 R, 225, 246, 209 M; 361/91.1, 91.2, 15, 16

(56) References Cited

U.S. PATENT DOCUMENTS 5,338,110 A * 8/1994 Byun .......................... 315/94
5,731,667 A * 3/1998 Luchetta et al. ............ 315/323

* cited by examiner

Primary Examiner—Tuyet Thi Vo
(74) Attorney, Agent, or Firm—Dicran Halajian

(57) ABSTRACT

The present invention relates to a device for operating a high-pressure discharge lamp, comprising a switched mode power supply circuit (SMPS) for supplying power to the high pressure discharge lamp from a supply voltage, the power supply circuit comprising a half bridge commutating forward (HBCF) circuit including an inductance¿$^{(L}$hbcf?), a capacitor circuit of a first capacitor ($C_{s1}$) and a second capacitor ($C_{s2}$) in series, the lamp (LA) being connectable between the inductance ($L_{hbcf}$) and a point (M) between the first and second capacitor ($C_{s1}$,$C_{s2}$); wherein overvoltage protection means are connected parallel to the lamp, which switch from an off-state with a high resistance operation to an on-state with a low resistance operation when the voltage difference across the protection means exceeds a breakover voltage ($V_{bo}$), the breakover voltage ($V_{bo}$) being selected to correspond to a predetermined maximum voltage across the first or the second capacitor ($C_{s1}$,$C_{s2}$).

9 Claims, 2 Drawing Sheets

OVERVOLTAGE PROTECTION FOR HID LAMP BALLAST

FIELD OF THE INVENTION

The present invention relates to a device for operating a high-pressure discharge (HID) lamp.

DESCRIPTION OF THE RELATED ART

For operating discharge lamps ballast circuits are known comprising a switched-mode power supply (SMPS), connected between the mains and the lamp, for driving the discharge lamp. In a three stage ballast circuit the first stage of the switched-mode power supply comprises a preconditioner, for example a double rectifier for rectifying the mains (230 V, 50 Hz), combined with an up-converter. The second stage may comprise a down-converter (DC-DC converter), also called a forward or buck converter, for stabilizing the output current. The third stage of the ballast circuit comprises a commutator full bridge (and ignitor) to implement a square wave current operation of the lamp. In a two-stage ballast topology the down-converter and commutator bridge are replaced by a half-bridge commutating forward (HBCF) or a full-bridge commutating forward (FBCF) topology.

The half-bridge commutating forward (HBCF) circuit corresponds to a full-bridge commutating forward (FBCF) circuit wherein a part of the bridge is replaced by two (electrolytic) capacitors in series. The ballast in this topology comprises an up-converter in combination with a half bridge acting as double down-converter. This two stage ballast topology for operating a HID lamp is relatively simple and requires less relatively costly electronic components.

In order to increase the operating efficiency of the ballast, the output voltage or rail voltage of the up-converter is boosted during the start-up phase of the lamp, i.e. during ignition of the lamp, and lowered during normal operation of the lamp. Moreover during the start-up phase and also at the end of the life of the lamp, the lamp behavior may be irregular. In the above mentioned capacitor series circuit of the half-bridge commutating forward circuit this may be result in displacement of the midpoint voltage of the half-bridge, which may cause the maximum voltage rating of one of the capacitors to be exceeded. This may cause damage to the capacitors and/or the ballast circuit.

A solution to this problem might be to apply in the half-bridge of the ballast a capacitor series circuit with capacitors of enlarged maximum voltage ratings. This, however, will render the ballast more expensive and will increase the dimensions thereof.

SUMMARY OF THE INVENTION

The object of the present invention is to solve this problem and to provide a relatively low cost and simple circuit arrangement for operating a high pressure lamp.

According to the present invention a device is provided for operating a high-pressure discharge lamp, comprising a switched mode power supply circuit (SMPS) for supplying power to the high pressure discharge lamp from a supply voltage, the power supply circuit comprising a half bridge commutating forward circuit including an inductance, a capacitor circuit of a first capacitor and a second capacitor in series, the lamp being connectable between the inductance and a point between the first and second capacitor; wherein overvoltage protection means are connected parallel to the lamp, which switch from an off-state with a high resistance operation to an on-state with a low resistance operation when the voltage difference across the protection means exceeds a breakover voltage, the breakover voltage being selected to correspond to a predetermined maximum voltage across the first or the second capacitor.

When a lamp showing an irregular behavior is conducting in one half period and non-conducting in the other half period, the midpoint voltage, i.e. the voltage midway between the first and second capacitor, may drift away. If the midpoint voltage drifts away in such an amount that the preselected breakover voltage is exceeded, the overvoltage protection means switch change from the off-state, wherein the protection means show a high resistance behavior and hence (virtually) no current flows through the protection means, to the on-state wherein the protection means will conduct current. This will cause the midpoint voltage to be corrected to safe values. Hence, the overvoltage protection means prevent an overvoltage situation for each of the capacitors of the capacitor series circuit.

When in the on-state, the current through the protection means is limited by the short circuit control of the control means of the switched-mode power supply (SMPS).

Preferably the overvoltage protection means switch from the on-state to the off-state when the current through the protection means drops below a minimum holding current for a certain time (recombination time). During commutation of he current in the HBCF circuit the current changes direction with a predefined current slope. This means that the current level is low for some time and even zero for a moment. Hence, during commutation the current flowing through the protection means drops to values below the minimum holding current as a result of which the protection means return to the off-state. When the protection means return to the off-state, the high resistance mode of operation is entered again, as a result of which the protection means stop conducting current.

In a further preferred embodiment the overvoltage protection means comprise one or more bidirectional voltage-triggered semiconductor devices, which implies fast switching characteristics. In this embodiment the bidirectional device may be of a type with substantially symmetrical current-voltage I–V characteristics. This means that the situation of the midpoint voltage drifting to higher positive voltage values is treated in the same manner as the situation of the midpoint voltage drifting to higher negative values. Preferably the overvoltage protection means comprise a SIDAC or an equivalent semiconductor device having a high-resistance region of operation and a region of operation in which it simulates essentially a short. This device will simulate the "short" until the current flowing through the device is either interrupted or drops below a minimum holding current. Then the semiconductor device resets itself and returns to the high-resistance mode of operation.

In another preferred embodiment the device comprises an additional inductor connected in series with the semiconductor device of the protection means. This additional inductor protects the semiconductor device of the overvoltage protection means itself and is included to limit the current spike through the semiconductor device when this device switches from the off-state to the on-state and becomes conducting, the current spike being caused by a parallel third capacitor. The additional inductor preferably is an air inductor as an air inductor is non-saturating even in case of relatively high currents flowing through the semiconductor device.

In a further preferred embodiment the breakover voltage is selected to be in a range between 0,5 and 0,7 times the operating voltage of the switched mode power supply. For a rail operating rail voltage of about 500 V, i.e. an open circuit voltage of 250 V, a breakover voltage of about 270 V is selected, which corresponds to 0,54 times the operating voltage.

BRIEF DESCRIPTION OF THE DRAWINGS

Further advantages, features and details of the present invention will be elucidated with reference to the annexed drawings, in which.

DETAILED DESCRIPTION OF THE INVENTION

Figure 1:
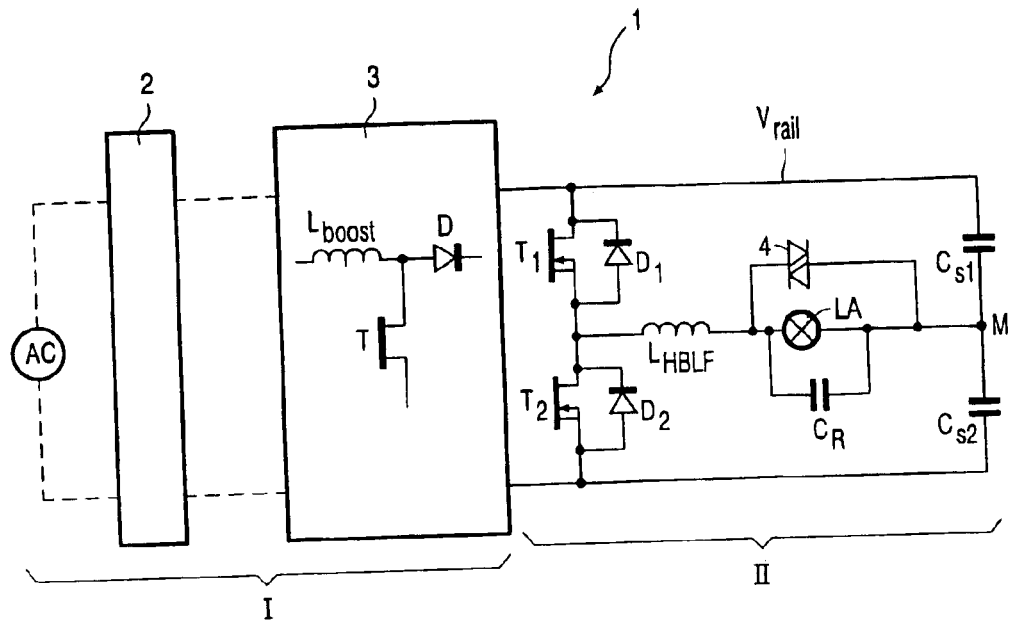
FIG. 1 shows a schematic circuit diagram of a first embodiment of the present invention.

FIG. 1 shows a two-stage ballast for a high discharge lamp LA. The first stage I of the ballast comprises a rectifier 2 for converting the AC supply voltage (typically a 230 V 50 HZ mains) to a DC supply voltage and an up-converter or boost-converter 3 for boosting the DC supply voltage. In FIG. 1 a typical topology of a boost-converter or up-converter is shown. The boost-converter inter alia is composed of an inductor $L_{boost}$, a switching element T and a diode D.

During the starting phase of the lamp the output voltage or rail voltage of the switched-mode power supply SMPS is boosted to create a sufficient open circuit voltage (OCV). The open circuit voltage required in this phase of lamp operation depends on the type of HID lamp used. Typically the rail voltage is boosted during the starting phase to about 500 V to create an OCV of 250 V. During subsequent normal operation of the lamp, the rail voltage is reduced (typically to about 400 V) to increase the efficiency of the ballast.

The second stage II of the ballast comprises a half bridge commutating forward (HBCF) circuit acting as a double down-converter. The HBCF circuit includes a first MOSFET T1, a second MOSFET T2, a first and a second (internal) body diode D1 and D2, a lamp inductor $L_{hbcf}$ in series with the lamp, a lamp capacitor $C_r$ connected parallel to the lamp, and two electrolytic capacitors $C_{s1}$ and $C_{s2}$ connected in series. The capacitors $C_{s1}$ and $C_{s2}$ are relatively small sized and inexpensive electrolytic capacitors, each having a maximum voltage rating of only 300 V. The half bridge commutating forward circuit is operated in the critical discontinuous mode to allow zero voltage switching. Each half commutation period (commutation frequency in the order of 100 Hz), one MOSFET (the first MOSFET T1 or the second MOSFET T2) is operated in combination with the diode (D2 or D1) of the other MOSFET.

During the start phase and/or at the end of the life (EOL) of the lamp, the lamp behavior may be irregular. In the capacitor series circuit $C_{s1},C_{s2}$ this may result in a displacement of the midpoint voltage, that is the voltage on a position M between the first electrolytic capacitor $C_{s1}$ and the second electrolytic capacitor $C_{s2}$. When the lamp LA for example is conducting in a first half period of the switched-mode power supply SMPS and non-conducting in a second half period of the switched-mode power supply SMPS, the midpoint voltage will drift away in the first half period from 250 V (in case of a rail voltage of 500 V) to voltage values exceeding the maximum voltage rating (300 V) of one of the electrolytic capacitors $C_{s1}$ and $C_{s2}$.

In order to prevent the maximum voltage rating of one of the capacitors to be exceeded, overvoltage protection means are provide. According to the embodiment shown in FIG. 1, a SIDAC 4 is placed between the "cold" side of the half bridge commutating forward coil $L_{HBCF}$ and the midpoint M of the series capacitor circuit. A SIDAC is a solid state device which, when a relatively low voltage is applied across its terminals and the device is in a standby mode of operation (off-state) does not conduct current except for a small leakage current $I_{drm}$ due to its high off-state resistance. However, when a high voltage exceeding a breakover voltage $V_{bo}$ appears across the terminals, the device switches to the on-state in which state the device commences to conduct current.

Figure 2:
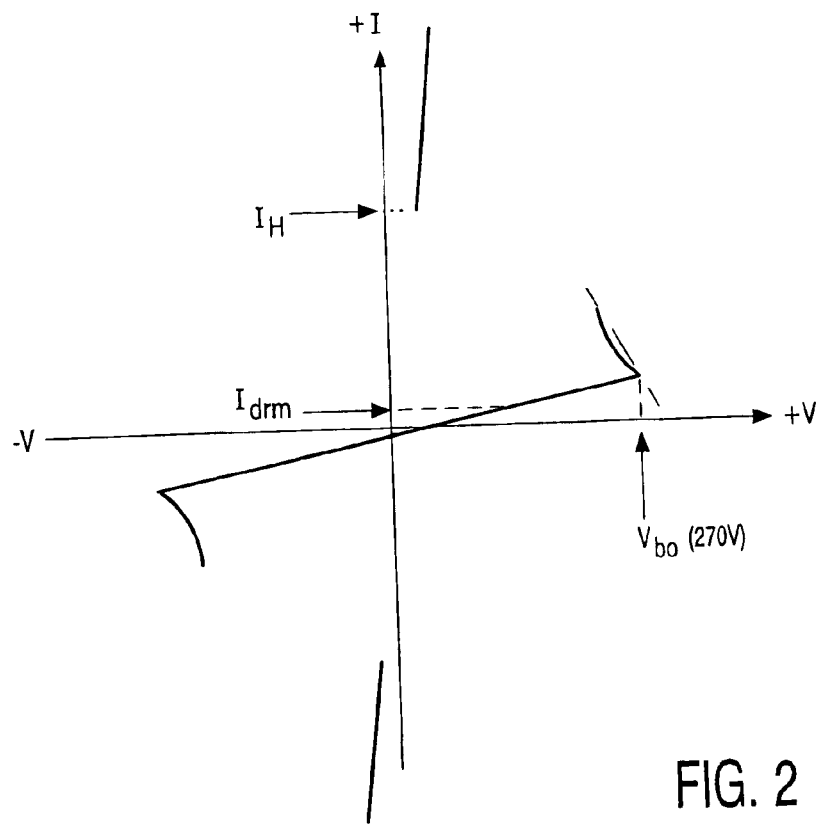
FIG. 2 shows a graph of the current I versus voltage V characteristics of a SIDAC.

FIG. 2 shows the I–V characteristics of a SIDAC. As illustrated in this figure, the leakage current $I_{drm}$ flowing through the SIDAC in the off-state is at a near-zero level until the SIDAC voltage reaches the breakover voltage $V_{bo}$. The breakover voltage is selected to correspond to the maximum desired midpoint voltage, which is below the maximum voltage rating of the electrolytic capacitors. In case of a maximum voltage rating of 300 V, a SIDAC may be selected with has a breakover voltage $V_{bo}$ of about 270 V. The midpoint voltage during the first period in which the lamp does conduct, drifts away. The voltage difference across the SIDAC equals the lamp voltage and is relatively low during this conductive state of the lamp. During the subsequent second period in which the lamp is not conducting and the full open circuit voltage (OCV) is across the SIDAC terminals, this voltage is higher when the voltage drift in the first period was larger. When the OCV in the second period equals or exceeds the breakover voltage of the SIDAC (in this case 270 V), the SIDAC transitions from a normal resistive mode of operation (off-state) into a current conducting state (on state). In this on-state of the SIDAC, the midpoint voltage is corrected to safe values.

During subsequent commutation of the current, i.e. when the next half period in which the lamp is conducting, starts, the SIDAC stops conducting as during commutation the current is interrupted or at least drops below the minimum holding current $I_h$ of the SIDAC. Hence, during commutation the SIDAC returns to its high resistance off-state and will be reactivated only if the voltage across the terminals again exceeds the breakover voltage.

In the above mentioned embodiment control means for controlling the overvoltage protection means may be dispensed with as switching from the on-state to the off-state is achieved automatically as a result of the commutation of the current in the half-bridge commutating forward (HBCF) circuit.

Figure 3:
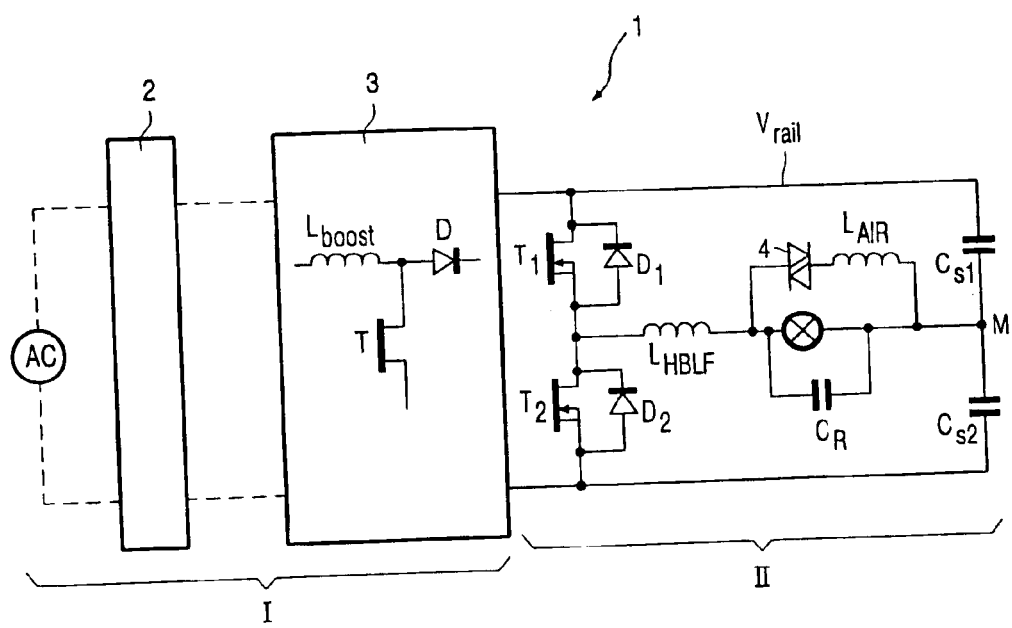
FIG. 3 shows a schematic circuit diagram of a second embodiment of the present invention.

In FIG. 3 a further preferred embodiment of the present invention is shown. In this embodiment an additional inductor $L_{air}$ is placed in series with the SIDAC and in parallel with the lamp. This inductor is provided to limit the current spike through the SIDAC when the SIDAC switches to the on-state and becomes conducting. This current spike is caused by the parallel capacitor $C_r$. The inductor is an air-inductor without in order to avoid saturation if the inductor in case of high currents flowing through the SIDAC.

The present invention is not limited to the above described preferred embodiments thereof; the rights sought are defined by the following claims, within the scope of which many modifications can be envisaged.

What is claimed is:

1. Device for operating a high-pressure discharge lamp, comprising a switched mode power supply circuit (SMPS) for supplying power to the high pressure discharge lamp from a supply voltage, the power supply circuit comprising a half bridge commutating forward (HBCF) circuit including an inductance ($L_{hbcf}$), a capacitor circuit of a first capacitor ($C_{s1}$) and a second capacitor ($C_{s2}$) in series, the lamp (LA) being connectable between the inductance ($L_{hbcf}$) and a point (M) between the first and second capacitor ($C_{s1}$, $C_{s2}$); wherein overvoltage protection means are connected parallel to the lamp, which switch from an off-state with a high resistance operation to an on-state with a low resistance operation when the voltage difference across the protection means exceeds a breakover voltage ($V_{bo}$), the breakover voltage ($V_{bo}$) being selected to correspond to a predetermined maximum voltage across the first or the second capacitor ($C_{s1}$, $C_{s2}$).

2. Device according to claim 1, wherein the overvoltage protection means switch from the on-state to the off-state when the current through the protection means {optie van interruptie van de stroom verwijderd} drops below a minimum holding current Ih.

3. Device according to claim 1, wherein the breakover voltage is selected to be in a range between 0,5 and 0,7 times the operating voltage ($V_{rail}$) of the switched mode power supply.

4. Device according to claim 1, comprising control means for controlling the switched-mode power supply (SMPS) so as to limit the current through the protection means when the protection means are in the on-state.

5. Device according to claim 1, wherein the overvoltage protection means comprise one or more bidirectional voltage-triggered semiconductor devices.

6. Device according to claim 5, wherein the bidirectional semiconductor device is of a type with substantially symmetrical current-voltage (I–V) characteristics.

7. Device according to claim 5, comprising an additional inductor ($L_{air}$) in series with the semiconductor device.

8. Device according to claim 5, wherein the semiconductor device is a SIDAC.

9. Device according to claim 8, wherein the additional inductor is an air inductor.

* * * * *